(12) United States Patent
Kim et al.

(10) Patent No.: US 11,319,609 B2
(45) Date of Patent: May 3, 2022

(54) STEEL FOR CRANKSHAFT AND METHOD OF MANUFACTURING CRANKSHAFT USING THE SAME

(71) Applicants: Hyundai Motor Company, Seoul (KR); KIA Motors Corporation, Seoul (KR); HYUNDAI STEEL COMPANY, Incheon (KR)

(72) Inventors: Sung Hwan Kim, Seoul (KR); Chan Woo Kim, Dangjin-si (KR)

(73) Assignees: Hyundai Motor Company, Seoul (KR); Kia Motors Corporation, Seoul (KR); Hyundai Steel Company, Incheon (KR)

( * ) Notice: Subject to any disclaimer, the term of this patent is extended or adjusted under 35 U.S.C. 154(b) by 212 days.

(21) Appl. No.: 16/530,696

(22) Filed: Aug. 2, 2019

(65) Prior Publication Data

US 2020/0131594 A1   Apr. 30, 2020

(30) Foreign Application Priority Data

Oct. 29, 2018   (KR) ........................ 10-2018-0129615

(51) Int. Cl.
```
C21D 9/30      (2006.01)
C21D 8/06      (2006.01)
C21D 6/00      (2006.01)
C22C 38/38     (2006.01)
C22C 38/28     (2006.01)
C22C 38/24     (2006.01)
C22C 38/00     (2006.01)
F16C 3/08      (2006.01)
```

(52) U.S. Cl.
CPC .............. *C21D 9/30* (2013.01); *C21D 6/002* (2013.01); *C21D 6/005* (2013.01); *C21D 6/008* (2013.01); *C21D 8/065* (2013.01); *C22C 38/002* (2013.01); *C22C 38/24* (2013.01); *C22C 38/28* (2013.01); *C22C 38/38* (2013.01); *F16C 3/08* (2013.01); *F16C 2202/06* (2013.01); *F16C 2204/62* (2013.01); *F16C 2204/66* (2013.01); *F16C 2204/74* (2013.01); *F16C 2220/06* (2013.01); *F16C 2220/44* (2013.01); *F16C 2220/46* (2013.01); *F16C 2240/06* (2013.01)

(58) Field of Classification Search
CPC ............ B22D 11/001; C21D 2211/005; C21D 2211/009; C21D 6/002; C21D 6/005; C21D 6/008; C21D 8/065; C21D 9/30; C22C 38/002; C22C 38/02; C22C 38/04; C22C 38/24; C22C 38/28; C22C 38/38
See application file for complete search history.

(56) References Cited

U.S. PATENT DOCUMENTS 5,279,688 A   1/1994   Isokawa et al.

FOREIGN PATENT DOCUMENTS

| CN | 102071368 A | 5/2011 | |
|---|---|---|---|
| CN | 105369124 A | 3/2016 | |
| EP | 3168319 A1 * | 5/2017 | ............... C21C 7/10 |
| JP | 06287677 A * | 10/1994 | |
| JP | 0770698 A * | 1/1995 | |
| JP | 2000-204432 A | 7/2000 | |
| JP | 2016-540881 A1 | 12/2016 | |

OTHER PUBLICATIONS

Office Action dated Dec. 3, 2021 in corresponding Chinese Application No. CN 2019107977759.

* cited by examiner

*Primary Examiner* — Jenny R Wu
(74) *Attorney, Agent, or Firm* — Mintz Levin Cohn Ferris Glovsky and Popeo, P.C.; Peter F. Corless

(57) ABSTRACT

Steel for a crankshaft includes 0.37 to 0.42 wt % of carbon (C), 0.55 to 0.70 wt % of silicon (Si), 1.45 to 1.65 wt % of manganese (Mn), 0.025 wt % or less (excluding 0 wt %) of phosphorus (P), 0.020 to 0.035 wt % of sulfur (S), 0.15 to 0.30 wt % of chromium (Cr), 0.035 to 0.055% of vanadium (V), and the remainder of Fe and other inevitable impurities. The steel for a crankshaft has strength that is maintained high even when reducing the amount of vanadium.

7 Claims, 8 Drawing Sheets

[FIG. 1A]
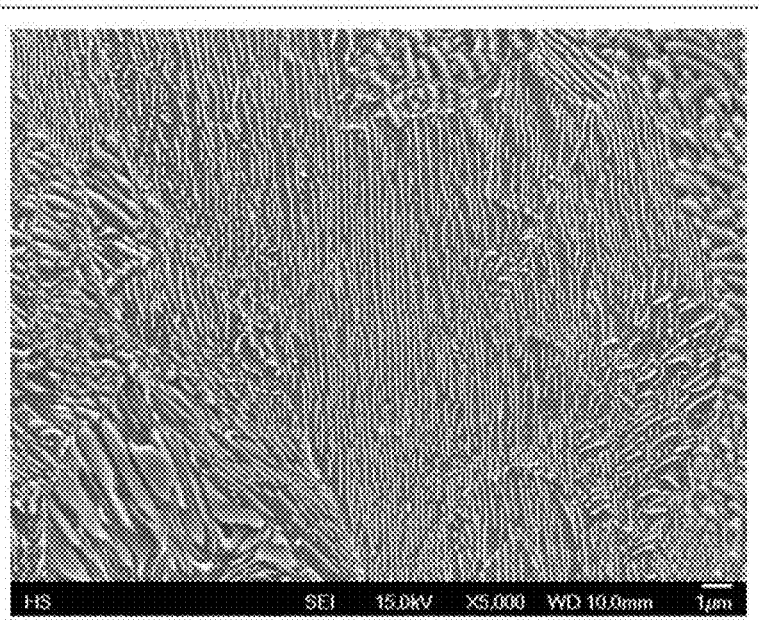

[FIG. 1B]
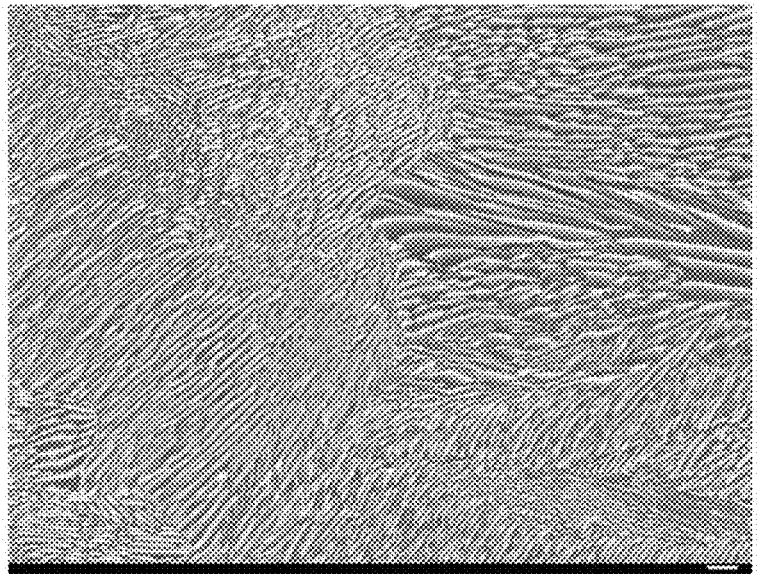

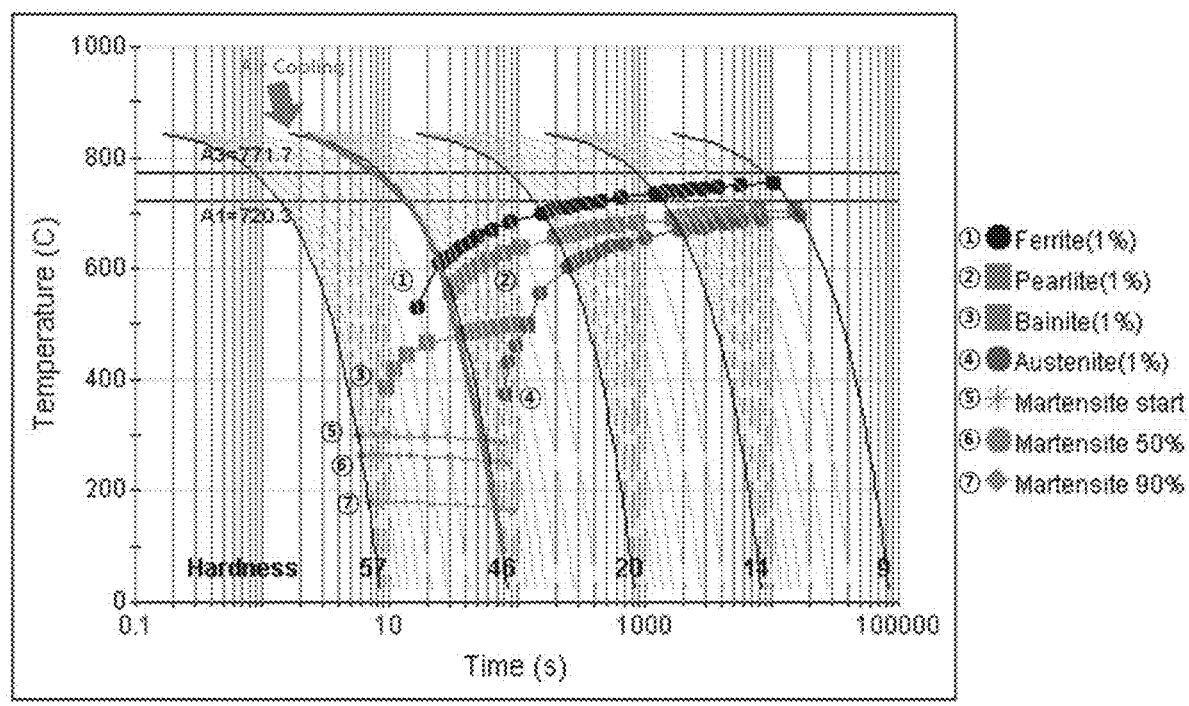
[FIG. 2A]

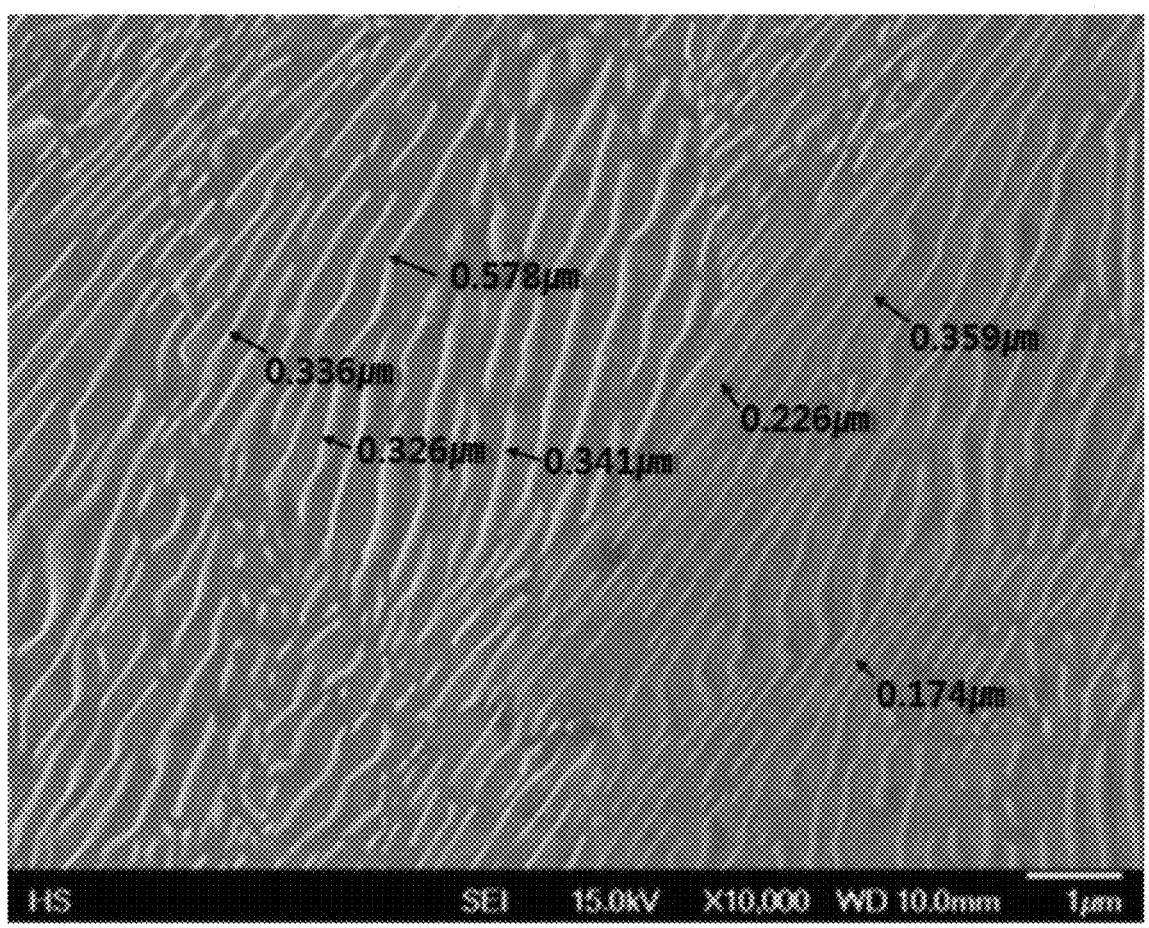
[FIG. 2B]

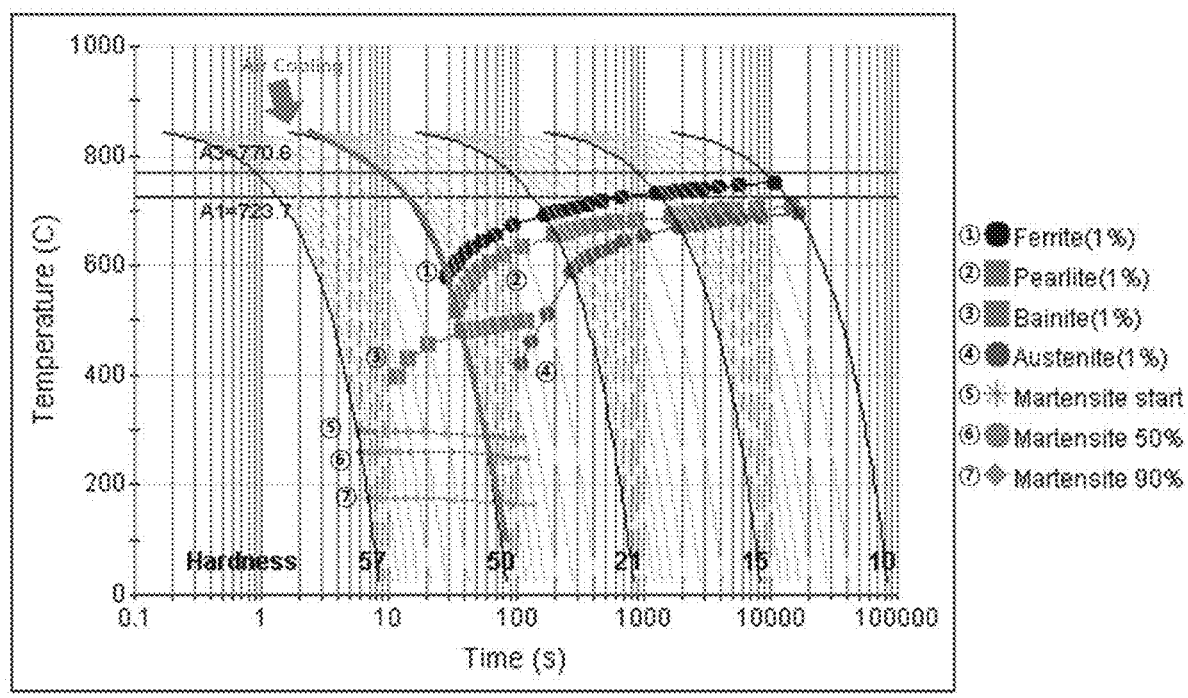
[FIG. 3A]

[FIG. 3B]
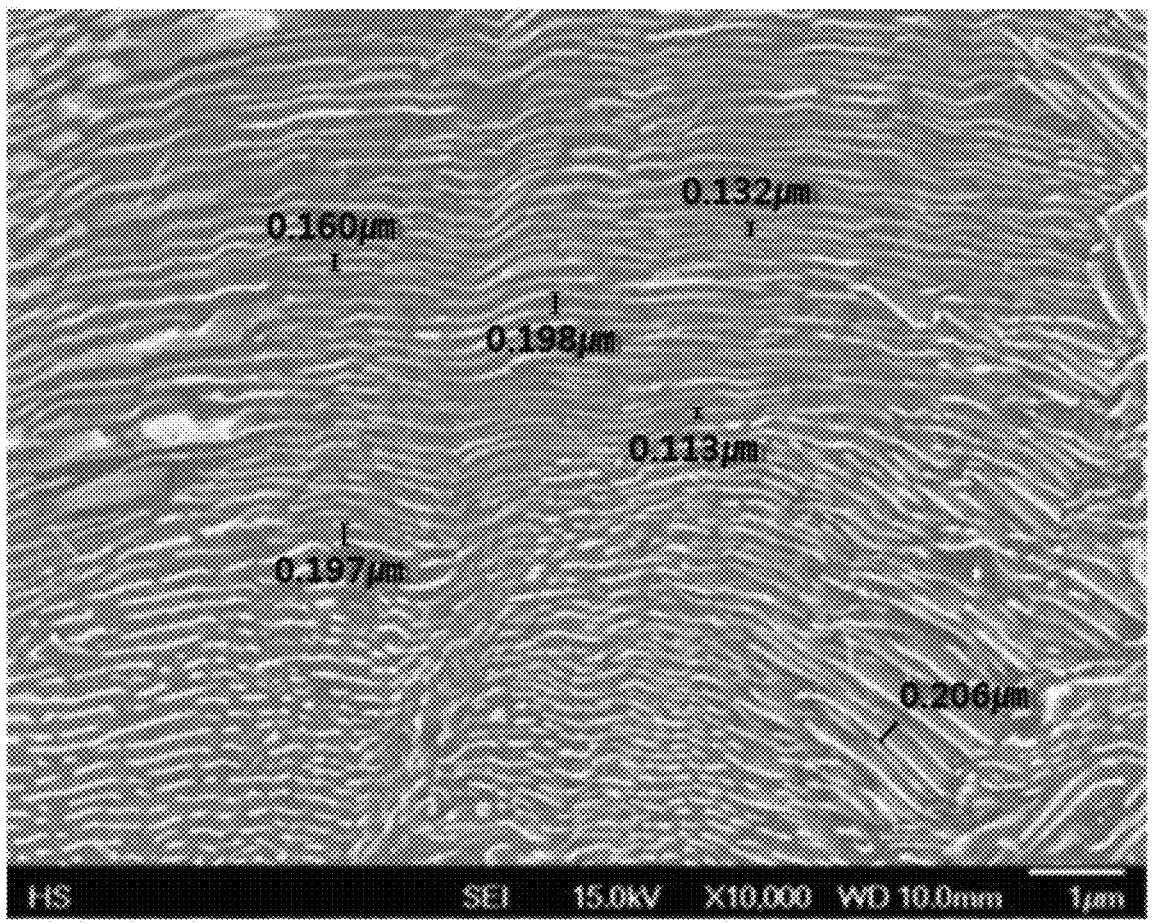

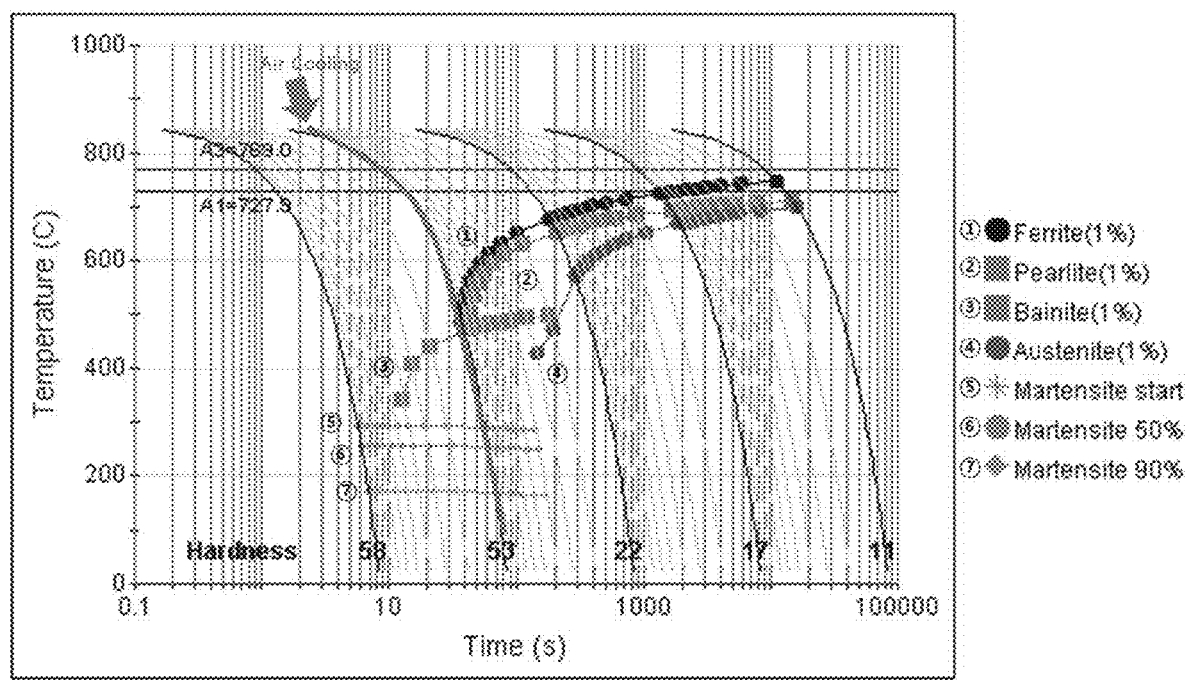
[FIG. 4A]

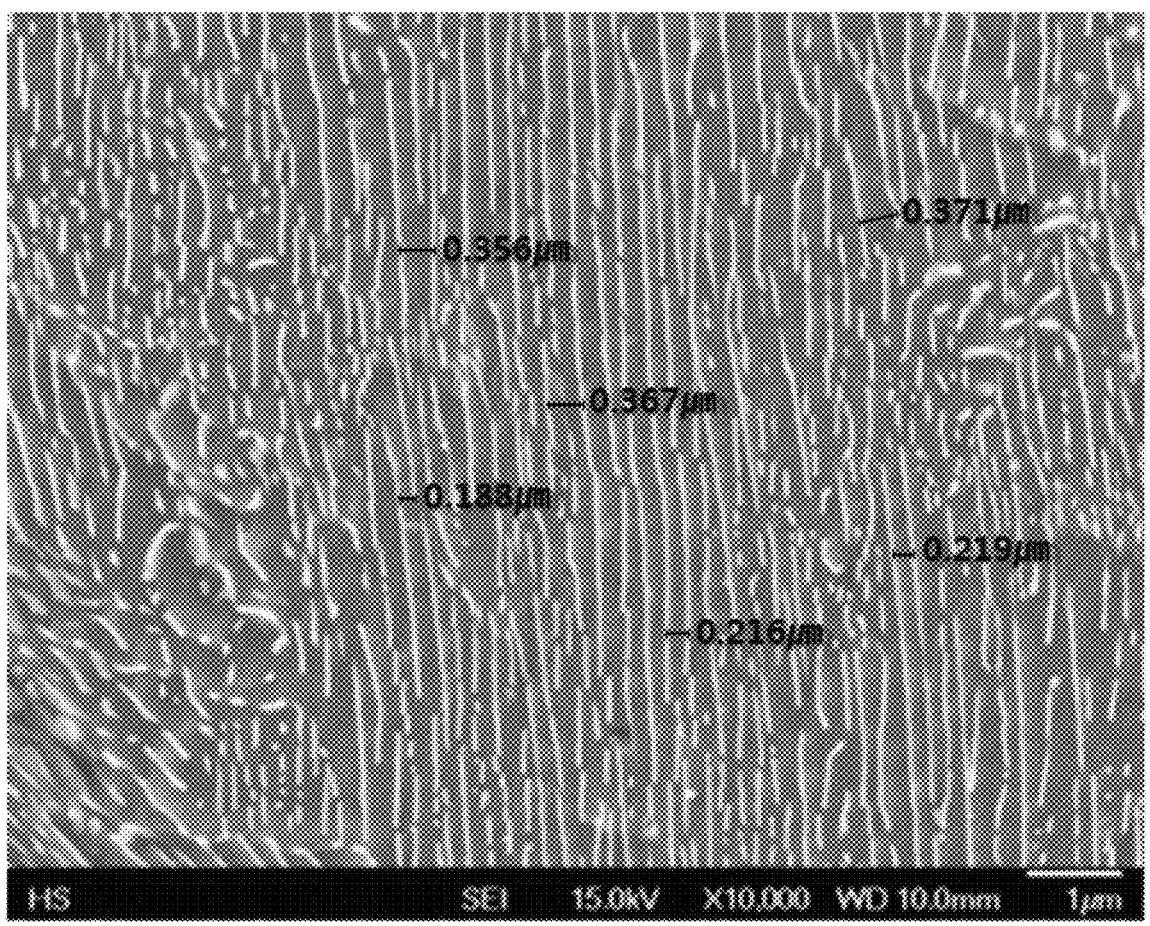
[FIG. 4B]

STEEL FOR CRANKSHAFT AND METHOD OF MANUFACTURING CRANKSHAFT USING THE SAME

CROSS REFERENCE TO RELATED APPLICATION

The present application claims priority to Korean Patent Application No. 10-2018-0129615, filed Oct. 29, 2018, the entire content of which is incorporated herein for all purposes by this reference.

BACKGROUND

1. Field

The present disclosure relates to steel for a crankshaft and a method of manufacturing a crankshaft using the same.

2. Description of the Related Art

A crankshaft, which is a member for converting the linear power of a piston obtained by the explosion stroke in each cylinder of a vehicle engine into rotational motion through a connecting rod, is an important part of a vehicle requiring high strength.

Such a crankshaft requires high strength and is thus manufactured by appropriately subjecting heat-treated steel to hot forging and quenching/tempering (Q/T) heat treatment.

SUMMARY

One aspect of the present invention provides steel for a crankshaft and a method of manufacturing a crankshaft using the same, in which the amount of an expensive alloy component, among alloy components of useful non-heat-treated steel having ferrite and pearlite structures, is decreased, and the amounts of the remaining alloy components are optimized, and simultaneously, an increase in costs occurring during a cooling process may be minimized, thereby reducing manufacturing costs and ensuring strength equivalent or superior to conventional cases. In the steel for a crankshaft, strength may be maintained high even when reducing the amount of vanadium, which is an expensive alloy element.

An embodiment of the present invention provides steel for a crankshaft, comprising: 0.37 to 0.42 wt % of carbon (C), 0.55 to 0.70 wt % of silicon (Si), 1.45 to 1.65 wt % of manganese (Mn), 0.025 wt % or less (excluding 0 wt %) of phosphorus (P), 0.020 to 0.035 wt % of sulfur (S), 0.15 to 0.30 wt % of chromium (Cr), 0.035 to 0.055% of vanadium (V), and the remainder of Fe and other inevitable impurities.

The steel may further comprise 0.020 wt % or less of titanium (Ti).

The steel may have yield strength of 600 MPa or more.

The steel may have tensile strength of 900 MPa or more.

The steel may have fatigue strength of 40 kgf/mm$^2$ or more.

The steel may be configured such that pearlite and ferrite structures are formed and the average lamellar spacing of pearlite is 0.20 μm or less.

In addition, another embodiment of the present invention provides a method of manufacturing steel for a crankshaft, comprising: preparing molten steel comprising 0.37 to 0.42 wt % of carbon (C), 0.55 to 0.70 wt % of silicon (Si), 1.45 to 1.65 wt % of manganese (Mn), 0.025 wt % or less (excluding 0 wt %) of phosphorus (P), 0.020 to 0.035 wt % of sulfur (S), 0.15 to 0.30 wt % of chromium (Cr), 0.035 to 0.055% of vanadium (V), and the remainder of Fe and other inevitable impurities; preparing an intermediate by subjecting the molten steel to continuous casting and then rolling; forming a forged product by subjecting the intermediate to hot forging; and cooling the forged product under air-cooling conditions.

In the preparing the molten steel, the molten steel may further comprise 0.020 wt % or less of titanium (Ti).

The forming the forged product may include subjecting the intermediate to heating to a temperature of 1200 to 1300° C. and then hot forging.

The forged product cooled in the cooling the forged product may be configured such that pearlite and ferrite structures are formed, the average lamellar spacing of pearlite is 0.20 μm or less, the yield strength is 600 MPa or more, the tensile strength is 900 MPa or more, and the fatigue strength is 40 kgf/mm$^2$ or more.

According to embodiments of the present invention, the amount of vanadium (V), which is an expensive alloy component among alloy components, is decreased and the amounts of silicon (Si), manganese (Mn) and chromium (Cr) are optimized, thereby reducing the cost of manufacturing non-heat-treated steel having ferrite and pearlite structures.

Furthermore, the amounts of main alloy components are optimized and the resulting forged product is cooled only through air cooling without additional Q/T heat treatment, whereby non-heat-treated steel in which ferrite and pearlite structures are formed is manufactured and the pearlite interlamellar spacing is narrowed by about 26% compared to conventional cases, thus obtaining a crankshaft having yield strength of 600 MPa or more, tensile strength of 900 MPa or more, and fatigue strength of 40 kgf/mm$^2$ or more.

BRIEF DESCRIPTION OF THE DRAWINGS

FIG. 1A is a scanning electron microscope (SEM) image showing an example of the structure of steel;

FIG. 1B is an SEM image showing the structure of steel according to Example of the present invention; and FIGS. 2A, 2B, 3A, 3B, 4A, and 4B are CCT curve graphs and SEM images of Examples and Comparative Examples depending on changes in the amount of chromium (Cr).

DESCRIPTION OF EMBODIMENTS

Hereinafter, a detailed description will be given of embodiments of the present invention with reference to the appended drawings. However, the present invention is not limited to the following embodiments, which may be changed to have various forms.

Crankshafts may be manufactured using non-heat-treated steel, which may omit the heat treatment process compared to the heat-treated steel. The use of non-heat-treated steel may reduce processing costs. However, since the non-heat-treated steel contains a large amount of vanadium (V), which is an expensive alloy element, in order to compensate for the decrease in strength resulting from the omission of the heat treatment process, the manufacturing cost thereof may be still high.

According to embodiments of the present invention, steel for a crankshaft, which is used to convert the linear power obtained from a vehicle engine into rotational motion, is improved in properties such as yield strength, tensile strength and fatigue strength while reducing the cost of alloy elements by optimizing the amounts of main alloy components. In particular, the steel for a crankshaft according to embodiments of the present invention is adjusted in alloy components so as to enable air cooling after hot forging in order to increase productivity.

Specifically, one embodiment of the present invention pertains to non-heat-treated steel having ferrite and pearlite structures, the non-heat-treated steel comprising 0.37 to 0.42 wt % of carbon (C), 0.55 to 0.70 wt % of silicon (Si), 1.45 to 1.65 wt % of manganese (Mn), 0.025 wt % or less (excluding 0 wt %) of phosphorus (P), 0.020 to 0.035 wt % of sulfur (S), 0.15 to 0.30 wt % of chromium (Cr), 0.035 to 0.055% of vanadium (V), and the remainder of Fe and other inevitable impurities. The steel may further comprise 0.020 wt % or less of titanium (Ti).

In the embodiment of the present invention, the reason for limiting the alloy components and the amounts thereof is as follows, and unless otherwise mentioned, % expressed in units of the amounts of the components indicates wt %.

Carbon (C): 0.37 to 0.42%

Carbon (C) is an important element for increasing the strength of steel.

In embodiments, the amount of carbon (C) is equal to or more than 0.37% to ensure desired values of properties such as yield strength, tensile strength and fatigue strength. The amount of carbon (C) is equal to or less than 0.42% to minimize or avoid the deterioration of processability. Hence, in embodiments, the amount of carbon (C) is in a range of 0.37 to 0.42%.

Silicon (Si): 0.55 to 0.70%

Silicon (Si) is an element for increasing the strength of steel and reinforcing a ferrite phase.

In embodiments, the amount of silicon (Si) is equal to or more than 0.55%, to ensure desired values of properties such as yield strength, tensile strength and fatigue strength. The amount of silicon (Si) is equal to or less than 0.70% to minimize or avoid occurrence of decarburization. Hence, in embodiments, the amount of silicon (Si) is in a range of 0.55 to 0.70%.

Manganese (Mn): 1.45 to 1.65%

Manganese (Mn) is an element for increasing the strength of steel, like silicon (Si).

In embodiments, the amount of manganese (Mn) is equal to or more than 1.45% to ensure desired values of properties such as yield strength, tensile strength and fatigue strength. The amount of manganese (Mn) is equal to or less than 1.65% to minimize or avoid occurrence of harmful segregation. Hence, in embodiments, the amount of manganese (Mn) is in a range of 1.45 to 1.65%.

Phosphorus (P): 0.025% or Less (Excluding 0%)

Phosphorus (P) is an element that is added to increase machinability and processability.

In embodiments, the amount of phosphorus (P) is equal to or less than 0.025% to minimize or avoid deterioration of toughness or fatigue resistance. Hence, in embodiments, the maximum amount of phosphorus (P) is 0.025%.

Sulfur (S): 0.020 to 0.035%

Sulfur (S) is an element that is added to increase machinability and processability.

In embodiments, the amount of sulfur (S) is equal to or more than 0.020% to provide improvement in machinability and processability. The amount of sulfur (S) is equal to or less than 0.035% to minimize or avoid surface defect sensitivity increase which may be caused by MnS inclusions in parting lines after hot forging. Hence, in embodiments, the amount of sulfur (S) is in a range of 0.020 to 0.035%.

Chromium (Cr): 0.15 to 0.30%

Chromium (Cr) is an element that is added to increase strength.

In embodiments, the amount of chromium (Cr) is equal to or more than 0.15% to ensure an increase in strength. The amount of chromium (Cr) is equal to or less than 0.30% to minimize or avoid deterioration of toughness and processability. Hence, in embodiments, the amount of chromium (Cr) is in a range of 0.15 to 0.30%.

Vanadium (V): 0.035 to 0.055%

Vanadium (V) is an element for increasing the strength of a material by precipitating fine carbonitrides.

However, since vanadium (V) is expensive, in embodiments, the amount of vanadium (V) is in a range of 0.035 to 0.055% in order to achieve a cost reduction. According to embodiments of the present invention, a decrease in strength due to the addition of vanadium (V) in a small amount is compensated for through control of the amounts of silicon (Si), manganese (Mn) and chromium (Cr).

Titanium (Ti): 0.020% or Less

Titanium (Ti) is an element for increasing strength, like silicon (Si), manganese (Mn), chromium (Cr) and vanadium (V). However, the addition of a very large amount thereof may be avoided to minimize or avoid deterioration of fatigue strength.

In embodiments, the amount of titanium (Ti) is equal to or less than 0.020% to minimize or avoid fatigue strength decrease that may be caused by the formation of coarse inclusions. Hence, in embodiments, the maximum amount of titanium (Ti) is 0.020%.

The remaining components other than the above components are iron (Fe) and inevitable impurities.

In order to manufacture steel for a crankshaft according to embodiments of the present invention, molten steel having the above composition is prepared, after which the prepared molten steel is subjected to continuous casting and rolling, thus obtaining an intermediate.

After the rolling process, the intermediate is reheated and then hot forged, thus forming a forged product. In embodiments, the reheating temperature is set to the range of 1200 to 1300° C.

The forged product formed through hot forging is cooled under air-cooling conditions.

In embodiments of the present invention, the amount of an alloy component, especially chromium (Cr), is adjusted and thus the hot-forged product is subjected to air cooling even without precise cooling control, whereby pearlite and ferrite structures are formed and the lamellar spacing of pearlite may be controlled to 0.20 µm or less. Accordingly, there is no need for additional heat treatment equipment, and it is expected that desired properties and productivity may be ensured even under simple air-cooling conditions.

A better understanding of embodiments of the present invention will be given through the following examples and comparative examples.

Experiments were conducted to produce final products under conditions for producing steel for crankshafts. Molten steel comprising the components in the amounts shown in Table 1 below was subjected to continuous casting to give a bloom, which was then subjected to hot rolling to afford an intermediate, following by hot forging, thus forming a forged product, which was then cooled under air-cooling conditions. Experiments were conducted to measure the properties of the steel for a crankshaft of each of Examples and Comparative Examples thus manufactured. The results are shown in Table 2 below.

The tensile strength and yield strength were measured according to ISO 6892 tensile testing at room temperature.

Furthermore, fatigue strength was measured by rotating-bending fatigue evaluation according to ISO 1143 Metallic materials—Rotating bar bending fatigue testing.

TABLE 1

| Classification | C | Si | Mn | P | S | Cr | Ti | V |
|---|---|---|---|---|---|---|---|---|
| steel (38MnVS6) | 0.38 | 0.57 | 1.4 | 0.005 | 0.057 | 0.15 | — | 0.1 |
| Example 1 | 0.408 | 0.603 | 1.6 | 0.005 | 0.027 | 0.205 | — | 0.048 |
| Example 2 | 0.408 | 0.603 | 1.6 | 0.005 | 0.027 | 0.205 | 0.02 | 0.048 |
| Comp. Example 1 | 0.40 | 0.61 | 1.56 | 0.0055 | 0.032 | 0.209 | — | — |
| Comp. Example 2 | 0.408 | 0.594 | 1.59 | 0.0049 | 0.019 | 0.208 | 0.021 | — |

TABLE 2

| Classification | Tensile strength (MPa) | Yield strength (MPa) | Fatigue strength (kgf/mm$^2$) |
|---|---|---|---|
| steel (38MnVS6) | 909 | 638 | 40 |
| Example 1 | 981 | 662 | 41 |
| Example 2 | 999 | 675 | 42 |
| Comp. Example 1 | 863 | 538 | 37 |
| Comp. Example 2 | 873 | 501 | 38 |

As is apparent from Tables 1 and 2, Examples 1 and 2, in which the amounts of individual components were controlled in the ranges as described above, exhibited yield strength of 600 MPa or more, tensile strength of 900 MPa or more and fatigue strength of 40 kgf/mm$^2$ or more by decreasing the amount of vanadium (V) and optimizing the amounts of silicon (Si), manganese (Mn) and chromium (Cr) compared to steel (38MnVS6). Thus, an improvement in properties equivalent or superior to steel (38MnVS6) was achieved in terms of yield strength, tensile strength and fatigue strength while reducing production costs by decreasing the amount of vanadium (V).

In contrast, Comparative Example 1 reduced production costs by excluding vanadium (V) from steel (38MnVS6), but desired properties were not realized in the steel composition containing no vanadium (V).

Although Comparative Example 2 reduced production costs by excluding vanadium (V) from steel (38MnVS6), titanium (Ti) was added to compensate for the decrease in strength due to the exclusion of vanadium (V), but desired properties were not obtained only through the addition of titanium (Ti).

FIG. 1A is an SEM image showing the structure of steel (38MnVS6), and FIG. 1B is an SEM image showing the structure of steel of Example of the present invention. As shown in FIGS. 1A and 1B, the average lamellar spacing of pearlite was narrowed by about 26% in Example of the present invention compared to steel (38MnVS6), from which the properties of Example of the present invention were concluded to be improved.

FIGS. 2A and 2B to 4A and 4B are CCT curve graphs and SEM images of Examples and Comparative Examples depending on changes in the amount of chromium (Cr).

FIGS. 2A and 2B to 4A and 4B are CCT curve graphs of Example and Comparative Examples, in which the amount of chromium (Cr) was changed under the condition that the amounts of the alloy elements other than chromium (Cr) were maintained as in Example 1. FIGS. 2A and 2B show Comparative Example 3, in which the amount of chromium (Cr) was adjusted to 0.05 wt %, FIGS. 3A and 3B show Example 3, in which the amount of chromium (Cr) was adjusted to 0.20 wt %, and FIGS. 4A and 4B show Comparative Example 4, in which the amount of chromium (Cr) was adjusted to 0.40 wt %.

As is apparent from the results of observation of the structures of Comparative Examples 3 and 4 and Example 3 and of measurement of the pearlite lamellar spacing, Comparative Example 3 exhibited a distribution of pearlite lamellar spacing of 0.026 to 0.578 μm, Comparative Example 4 exhibited a distribution of pearlite lamellar spacing of 0.188 to 0.371 μm, and Example 3 exhibited a distribution of pearlite lamellar spacing of 0.113 to 0.206 μm.

As shown in the results of Comparative Examples 3 and 4 and Example 3 and in FIGS. 2A and 2B to 4A and 4B, when the amount of chromium (Cr) is less than or exceeds the range according to embodiments of the present invention, it is impossible to attain stable pearlite and ferrite structures under air-cooling conditions, and it is difficult to ensure pearlite lamellar spacing at a desired level.

Although embodiments of the present invention have been disclosed for illustrative purposes with reference to the appended drawings, the present invention is not limited thereto, and is defined by the accompanying claims. Therefore, those skilled in the art will appreciate that various modifications, additions and substitutions are possible, without departing from the scope and spirit of the invention as disclosed in the accompanying claims.

What is claimed is:

1. A steel for a crankshaft, consisting of:
0.37 to 0.42 wt % of carbon (C), 0.55 to 0.70 wt % of silicon 5 (Si), 1.45 to 1.65 wt % of manganese (Mn), 0.025 wt % or less and excluding 0 wt % of phosphorus (P), 0.020 to 0.035 wt % of sulfur (S), 0.15 to 0.30 wt % of chromium (Cr), 0.035 to 0.048% of vanadium (V), and a remainder of Fe and other inevitable impurities,
wherein the steel comprises pearlite and ferrite structures, and an average lamellar spacing of pearlite is 0.20 μm or less.

2. The steel of claim 1, wherein the steel has a yield strength of 600 MPa or more.

3. The steel of claim 1, wherein the steel has a tensile strength of 900 MPa or more.

4. The steel of claim 1, wherein the steel has a fatigue 20 strength of 40 kgf/mm$^2$ or more.

5. A method of manufacturing a steel for a crankshaft, comprising: preparing a molten steel consisting of 0.37 to 0.42 wt % of carbon (C), 0.55 to 0.70 wt % of silicon (Si), 1.45 to 1.65 wt % of manganese (Mn), 0.025 wt % or less and excluding 0 wt % of phosphorus (P), 0.020 to 0.035 wt % of sulfur (S), 0.15 to 0.30 wt % of chromium (Cr), 0.035 to 0.048% of vanadium (V), and a remainder of Fe and other inevitable impurities; preparing an intermediate by subjecting the molten steel to continuous casting and then rolling; forming a forged product by subjecting the intermediate to hot forging; and cooling the forged product under air-cooling conditions; thereby producing the steel of claim 1.

6. The method of claim 5, wherein the forming the forged product comprises subjecting the intermediate to heating to a temperature of 1200 to 1300° C. and then hot forging.

7. The method of claim 5, wherein the forged product cooled in the cooling comprises pearlite and ferrite structures, wherein an average lamellar spacing of pearlite is 0.20

µm or less, wherein a yield strength is 600 MPa or more, a tensile strength is 900 MPa or 5 more, and a fatigue strength is 40 kgf/mm2 or more.

* * * * *